June 21, 1938.   G. O. HARRISON   2,121,594
NETWORK DISTRIBUTION SYSTEM
Filed July 31, 1937   2 Sheets-Sheet 1
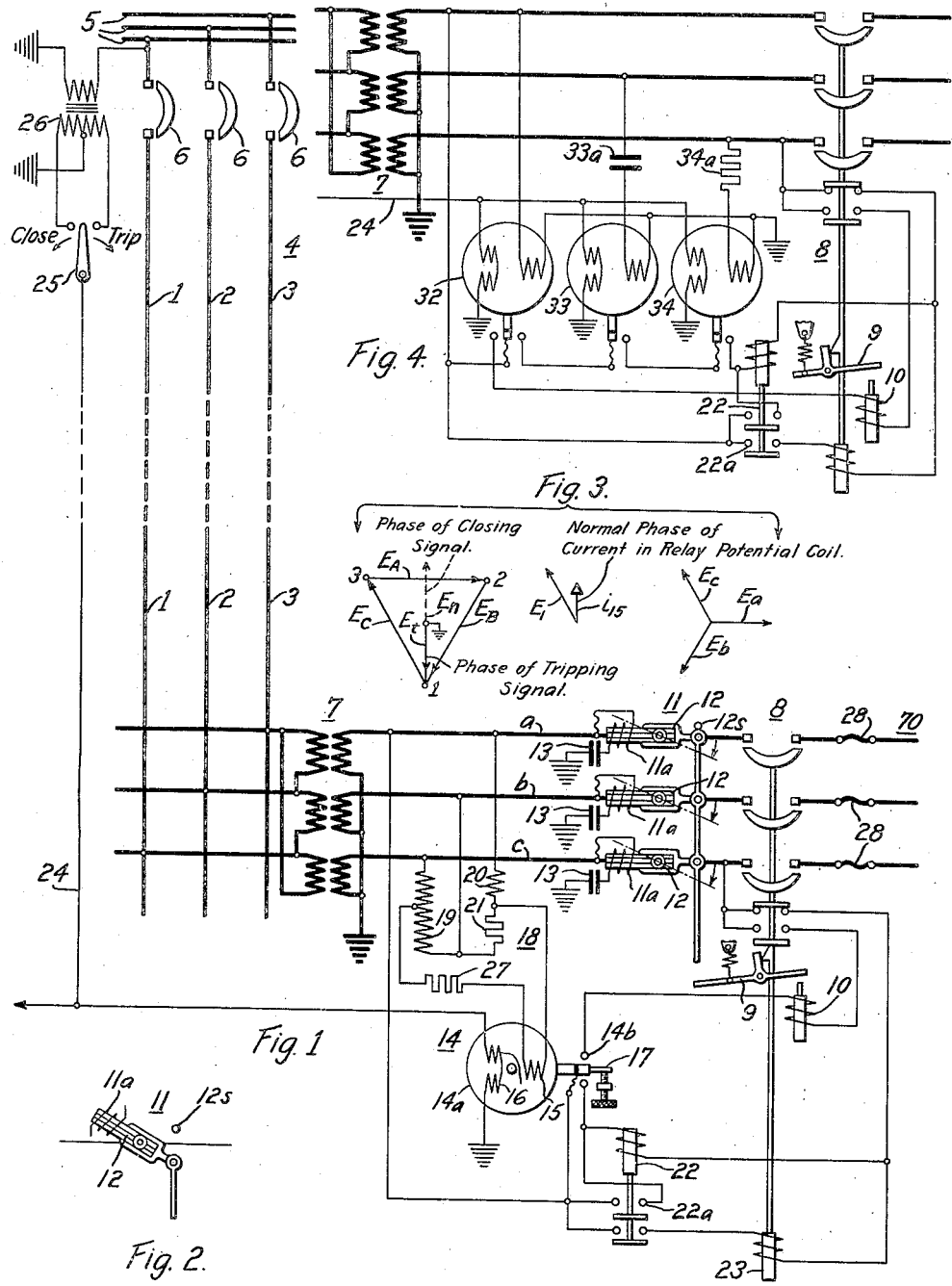
WITNESSES:
Wm. B. Sellers
Wm. C. Groome
INVENTOR
George. O. Harrison.
BY
ATTORNEY June 21, 1938.  G. O. HARRISON  2,121,594
NETWORK DISTRIBUTION SYSTEM
Filed July 31, 1937  2 Sheets-Sheet 2
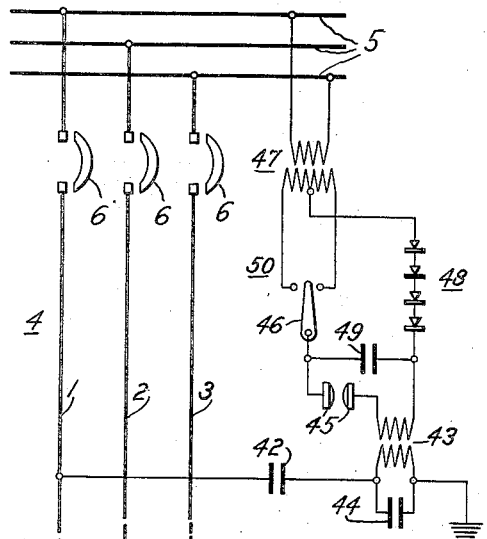
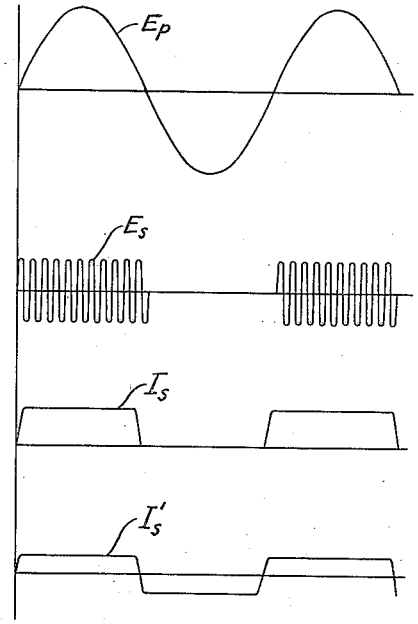
Fig. 7.
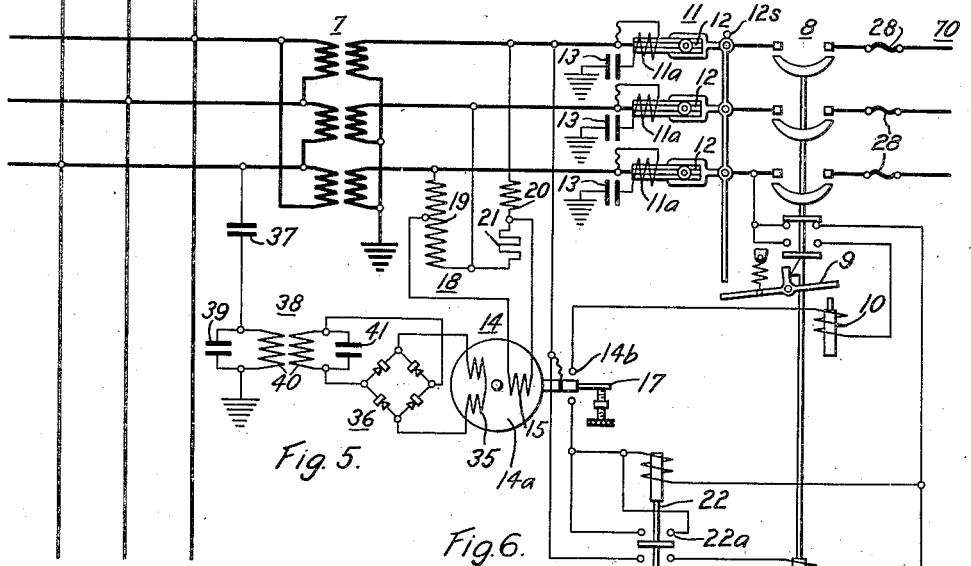
WITNESSES:
Wm. B. Sellers.
Wm. C. Groome
INVENTOR
George O. Harrison.
BY
ATTORNEY Patented June 21, 1938

2,121,594

UNITED STATES PATENT OFFICE 2,121,594

NETWORK DISTRIBUTION SYSTEM

George O. Harrison, Wilkinsburg, Pa., assignor to Westinghouse Electric & Manufacturing Company, East Pittsburgh, Pa., a corporation of Pennsylvania Application July 31, 1937, Serial No. 156,776

21 Claims. (Cl. 171—118)

My invention relates to alternating-current systems of transmission and distribution, and particularly to such systems in which a plurality of polyphase power circuits, supplied from a common source, are tied together by some form of power connection at their load ends.

In its more specific aspects, my invention relates to network distribution systems, in which a plurality of polyphase feeders, supplied from a common power source, are connected through a plurality of step-down transformers to a common network load circuit. In such systems, each feeder is provided with a feeder circuit breaker at its supply end for controlling its connection to the bus from which it is supplied and is also provided with a plurality of automatic circuit breakers, known as network protectors, disposed in the secondary leads of the transformers supplied from the feeder, so as to control the connection of the feeder to the network load circuit. The feeders and network load circuit may be overhead lines, but more commonly are underground cables carried in suitable ducts, the step-down transformers and network protectors being located in underground vaults.

In such systems, an individual feeder may be completely removed from service for repairs or other purposes, by opening the associated feeder circuit breaker and the network protectors which control its connection to the network load circuit. Following a feeder fault, the connections of the repaired feeder are commonly "phased out" in order to prevent connection of the incoming feeder to the system with any conductors transposed at the point of repair.

For such phasing out operation, it has heretofore been the practice to provide polyphase directional-type master relays which automatically compare the magnitude and phase relationship of polyphase voltages on the feeder and network sides of each network protector, and which complete a closing circuit for the associated network protector only when the voltage relationship is such that power will flow from the feeder to the network upon closure of the protector. The directional-type master relay also serves as a power directional relay to open the network protector in response to feeder faults.

Where a polyphase directional-type master relay, as described above, is used, it may be adjusted to respond to a reverse power value less than the magnetizing losses of the associated transformer bank, so that all of the network protectors corresponding to a particular feeder may be opened by merely opening the feeder breaker. For many locations, however, such a sensitive power adjustment is not practical, and it is necessary to adjust the relay for response to reverse power flow of the order of rated full load of the associated transformer bank.

Where such a non-sensitive power adjustment is used, there is no convenient way of opening the network protectors from the station during normal conditions, and the protectors must be opened by hand in the event that it becomes necessary to remove a feeder from service. Furthermore, if the transformer high-voltage windings are connected in delta, as is usually the case, the master relays will not respond to a single-phase-to-ground fault with the feeder breaker open. Following such a fault, therefore, there is danger that one or more protectors may fail to open, leaving one feeder conductor grounded and the feeder energized from the network. Under these conditions, part of the feeder and transformer insulation may be subjected to 173% normal voltage for long periods of time until the closed protectors are opened manually.

It is an object of my invention to provide a novel network distribution system in which the apparatus provided for phasing-out polyphase feeder connections may be used for positive control of the opening and closing operations of the network protectors from the central station or sub-station, irrespective of the type or adjustment of the devices used for opening the network protectors in response to a feeder fault.

Another object of my invention is to provide a novel method of identifying the conductors at the load end of a multiple circuit power cable, in order to prevent incorrect connection of the cable at its load end.

Other objects of my invention will become evident from the following detailed description taken in conjunction with the accompanying drawings, in which:

Figure 1 is a diagrammatic view showing part of a network distribution system embodying the invention, Fig. 2 is a diagrammatic view showing one of the direct trip devices of Fig. 1 in its operated position, Fig. 3 is a vector diagram showing the phase relationship of various alternating current quantities involved in the apparatus shown in Fig. 1, Fig. 4 is a diagrammatic view showing a modification of the control relay apparatus of the system shown in Fig. 1, Fig. 5 is a diagrammatic view showing a modification of the system shown in Fig. 1, Fig. 6 is a vector diagram showing the phase relationship of certain alternating quantities of the apparatus shown in Fig. 5; and Fig. 7 is a series of curves having time abscissae, showing the time variation of certain variables involved in the operation of the apparatus shown in Fig. 5.

In accordance with my invention, I provide a communication channel additional to the network feeder circuit, and transmit a signal over this communication channel to indicate the phase of voltage conditions supplied from the source to the incoming feeder circuit. The signal transmitted over the communication channel is compared with the phase of a voltage condition derived from the load end of the incoming feeder circuit, and the network circuit breaker is permitted to close only in the event that this comparison indicates that no feeder conductors have been transposed. The communication channel may consist of a separate circuit, such as a pilot wire or a telephone circuit, or may consist of the feeder conductors themselves acting as a channel for the transmission of carrier current impulses.

Referring to Fig. 1 of the drawings in detail, a feeder cable 4, consisting of phase conductors 1, 2, 3 is arranged to be connected to a polyphase supply bus 5 by means of a feeder circuit breaker 6.

The feeder circuit breaker 6 is provided with the usual relay apparatus for causing the feeder breaker to open in the event of a ground fault or a phase-to-phase fault on the feeder 4. As such apparatus is well known in the art and forms no part of the present invention, it has not been shown in the drawings.

The feeder 4 is connected to a number of transformer banks, one of which is shown at 7, which transform the relatively high feeder voltage to a value suitable for utilization on a network load circuit 70, from which lighting and power loads are supplied. The transformer banks 7 are preferably connected in delta on the feeder side and in star with neutral grounded on the load side, in accordance with the usual practice. It will be understood that the feeder 4 is one of a number of feeders connected to supply power from the bus 5 to the network load circuit 70.

A network circuit breaker 8 is interposed between the secondary leads of the transformer bank 7 and the network load circuit 70 for controlling the connection of the feeder to the network load circuit. The circuit breaker 8 is of the latched closed type, and is provided with a latch 9 which may be independently operated by a shunt-trip coil 10 or a direct-trip device 11. The direct-trip device 11 serves to open the network circuit breaker 8 in the event of a fault on the feeder 4 or in the high voltage circuit of the transformer bank 7. It will be understood that although a power directional direct-trip device 11 is shown for this purpose, any other suitable device or relay which will respond to faults on the feeder 4 but not to faults on the network load circuit 70, may be substituted therefor.

The direct-trip device 11 is preferably of the type disclosed in my prior Patent No. 2,077,321 granted April 13, 1937 and assigned to the Westinghouse Electric & Manufacturing Company. As described in this patent, the device consists of a laminated bar magnet 12 for each phase conductor of the network protector, each bar magnet being rotatably mounted upon the conductor bus bar in such manner as to rotate in a plane parallel to the bus bar. Although the phase conductors of the network protector are shown merely as heavy lines, it will be understood that they are commonly heavy rectangular bus bars upon which the bar magnets 12 may be conveniently mounted.

Each magnet 12 is preferably provided with a potential coil 11a, which is connected in series with a phase shifting capacitor 13, between the corresponding bus and ground. The capacitors 13 are of such capacitance value as to substantially neutralize the inductive reactance of the bar magnets, so that the current flow in the magnet coils is substantially in phase with the voltage to ground of the corresponding bus bar. In some applications, a slightly rotated power directional characteristic may be desired, and such characteristic may be secured by providing a slightly greater or less value of capacitance in the capacitors 13 than is necessary to exactly neutralize the inductive reactance of the corresponding magnet at the operating frequency, as explained in my prior patent mentioned above.

The network circuit breaker 8 is provided with an induction-type control relay 14 which serves to control the opening and closing of the circuit breaker 8 from the central station or sub-station supplying the associated feeder 4, and which also serves to compare the phase relationship of secondary voltages of the transformer bank 7 with the phase indication transmitted to the network circuit breaker over the communication channel mentioned above.

The control relay 14 is provided with an induction element shown as an induction disk 14a, which is subject to the magnetic fields produced by a potential coil 15 and a pair of voltage type coils 16. The coils 16 take the place of the usual current coils of a power directional relay, and may be designed for response to any convenient voltage, such as 110 v. The potential coil 15 and the voltage type coils 16 are associated with a magnetic structure (not shown) arranged to provide angularly displaced poles acting upon the disk 14a to produce a rotating field tending to rotate the disk 14a in one direction or the other, dependent upon the phase relationship of voltages impressed upon the coils 15 and 16.

The voltage type coils 16 are connected to a pilot wire 24, which serves as a common communication channel for all of the network protectors supplied by the feeder cable 4. The pilot wire 24 is arranged to be connected to either secondary terminal of a transformer 26 by means of a suitable two-pole switch 25. The transformer 26 is energized from any suitable circuit of the generating station or sub-station which provides a voltage having a fixed phase relationship to the polyphase voltages supplied to the feeder cable 4. In the arrangement shown, the transformer 26 has its primary circuit connected between one conductor of the supply bus 5 and ground, and has its secondary winding grounded at a midpoint. With the control relay 14 designed as described above, the transformer 26 would be designed to produce 110 v. between each secondary terminal and the grounded midpoint.

The potential coil 15 of the control relay 14 is connected to a positive phase sequence voltage filter 18, preferably of the type disclosed in U. S. Patent No. 1,936,797, of B. E. Lenehan, granted November 28, 1933 and assigned to Westinghouse Electric & Manufacturing Company. The positive sequence voltage filter 18 comprises an auto-transformer 19 having a tap to provide a voltage of approximately 40% of the total voltage impressed upon the auto-transformer 19, a reactor 20 and a resistor 21. The reactor 20 and resistor 21 are designed to produce a voltage drop across the resistor 21 proportional to 40% of the total voltage impressed upon the reactor 20 and resistor 21 in series, but displaced by 60° in the lag direction from the total voltage impressed upon the reactor 20 and resistor 21 in series.

With the phase sequence filter 18 designed as described above, and having its input terminals connected to the secondary terminals of the transformer bank 7 in the order indicated by the reference characters a, b, c, the output voltage of the phase sequence filter 18 is proportional to the positive symmetrical components of the polyphase system of secondary voltages of the transformer bank 7, and for the normal phase relationship of such voltages, is in phase with the c-phase secondary transformer voltage.

A phase adjusting resistor 27 is included in series with the potential coil 15 and the output terminals of the phase sequence filter 18, in order to cause the current in the circuit consisting of the potential coil 15 and the phase adjusting resistor 27 to lag the voltage impressed upon the latter circuit by a phase angle of approximately 30°. This 30° lag serves to produce maximum relay torque for the normal phase position of voltage of the pilot wire 24 as compared to the phase position of output voltage of the filter 18. It will be understood that if the phase adjusting resistor 27 were omitted, the relatively large inductive reactance of the potential coil 15 would cause a current lag of approximately 90°, as compared to the output voltage of the phase sequence filter 18, and maximum relay torque would not occur at the normal phase position of pilot wire voltage.

The potential coil 15 is preferably designed to draw a relatively small current, as compared to the current normally circulated through the elements of the phase sequence filter 18, in order to avoid distortion of the filter characteristics because of excessive load. The control relay 14 is provided with an adjusting spring 17 which opposes movement of the relay to closing position and which is preferably so adjusted that with normal voltage impressed upon the phase sequence filter 18, approximately 75% of the normal voltage of the pilot wire 24 is necessary to effect operation of the control relay 14 to its closing position. The induction armature of the control relay 14 also has a slight bias tending to maintain the movable contact out of engagement with the stationary tripping contact 14b. The movable element of the control relay 14, accordingly, stands in position midway between its tripping and closing positions, as shown, when the relay is deenergized.

A set of back-up fuses 28 are included between the network circuit breaker 8 and the network load circuit 70 for opening the connections from the network load circuit 70 to the feeder 4 in the event that the network circuit breaker 8 should fail to open for any reason during fault conditions on the feeder 4. For this purpose, the back-up fuses 28 may be designed to blow at a current value corresponding to 200% or 300% of the rated current of the bank of transformers 7, in accordance with the usual practice.

The operation of the apparatus shown in Fig. 1 may be set forth as follows: In order to operatively connect the feeder 4 between the supply bus 5 and the network load circuit 70, the feeder circuit breaker 6 is closed and the switch 25 is moved to its "closed" position. The order in which these operations are performed is immaterial, and if auxiliary contacts are available on the circuit breaker 6, they may be used instead of a separate switch 25. However, for purposes of illustration it will be assumed that a separate switch 25 is provided and the feeder circuit breaker 6 is first closed, and that thereafter the switch 25 is moved to its "closed" position.

Upon closure of the feeder breaker 6, the transformer bank 7 is energized with polyphase voltage of normal magnitude and phase relationship, and the transformer secondary voltage is of normal magnitude and consists almost entirely of positive sequence voltage. The positive sequence voltage filter 18, accordingly, develops its maximum output voltage, and current of normal phase relationship and maximum magnitude flows in the potential coil 15. As the voltage type of coils 16 are still deenergized, however, the control relay 14 develops no torque, and its armature remains in neutral position.

Upon operation of the switch 25 to "closed" position, the pilot wire 24 is energized with its normal voltage, and the control relay 14 develops a torque dependent upon the vector product of current in the potential coil 15 and voltage impressed upon the voltage type of coils 16.

The phase relationships of various quantities existing under these conditions are shown in Fig. 3. At the right of Fig. 3 the secondary star voltages of the transformer bank 7 are indicated by the vectors $E_a$, $E_b$ and $E_c$. In the central part of Fig. 3, the positive sequence voltage output of the filter 18 is indicated by the vector $E_1$. As mentioned above, this positive sequence voltage component is in phase with the c-phase secondary voltage of the transformer bank 7, denoted by the vector $E_c$ at the right of Fig. 3. The phase position of current in the potential coil 15, which lags the positive sequence voltage $E_1$ by a phase angle of 30°, is indicated at $i_{15}$ in the central part of Fig. 3.

At the right in Fig. 3, the delta voltages appearing across the primary windings of the transformer bank 7 are shown on a reduced scale as the vectors $E_A$, $E_B$ and $E_C$. The potential of the conductors 1, 2, 3 of the feeder 4 is indicated by circles designated 1, 2 and 3 in this part of the figure, and ground potential is indicated by the small circle at the center of the diagram. As the transformer 26 is connected between the feeder conductor 1 and ground on its primary side, the secondary voltage applied to the pilot wire 24 may be in phase with the voltage between conductor 1 and ground, as indicated by the vector $E_t$, or may be exactly out of phase with this voltage, as indicated by the vector $E_n$.

The polarity of the connections of the transformer 26 and the control relay 14 as mentioned above, are such that when the switch 25 is in its closing position and the feeder connections are correct, the control relay 14 develops its maximum torque in the closing direction. Assuming that the feeder connections are correct, the control relay 14, accordingly, operates in clockwise direction to complete a circuit for the contactor 22.

Upon energization of the contactor 22, the latter completes a holding circuit for itself by means of its auxiliary contacts 22a and also completes a closing circuit for the closing motor or solenoid 23 of the network circuit breaker 8. The network circuit breaker 8, accordingly, operates to closed position, thereby connecting the feeder 4 to the network load circuit 70.

During normal conditions of the system, power flows from the supply bus 5 through the feeder 4 and through the various banks of network transformers, such as 7 to the common network load circuit 70. Under these conditions, the trip device 11 develops a torque which tends to rotate the magnets 12 in the counter-clockwise direction, thereby maintaining the magnets parallel to the bus bars because of engagement of the movable parts with a stop 12s.

If a fault occurs on the network load circuit 70, the capacity of all of the transformer banks, such as 7, is available to provide a very heavy current flow at the point of fault, and the fault is burned off in the usual manner.

If a fault occurs on the feeder 4, the direction of power flow reverses, and power is supplied from the common network load circuit 70 in reverse direction through the transformer bank 7 to the fault. The torque developed by the trip device 11, under these conditions, also reverses and the magnets 12 rotate in clockwise direction away from the stop 12s into engagement with the latch 9. The network circuit breaker 8 is, accordingly, tripped open.

The fault on the feeder 4 also causes operation of the protective relays associated with the feeder breaker 6, and the latter also trips open to entirely disconnect the faulted feeder 4.

After the fault on feeder 4 has been repaired, the feeder may be restored to operation by closing the feeder breaker 6 and operating the switch 25 to its closed position in the manner described above.

However, if in repairing the fault on the feeder 4, any two conductors of the cable have been transposed, the voltages appearing across the secondary terminals of the transformer bank 7 will be of reversed sequence, and the positive sequence voltage component segregated by the filter 18 will be substantially zero. The control relay 14, accordingly, will remain deenergized under these conditions, and the network circuit breaker 8 will remain open.

Similarly, if all three conductors 1, 2 and 3 have been rotated 120 electrical degrees or 240 electrical degrees and incorrectly connected, the secondary voltage developed by the transformer bank 7 will be of normal sequence, but will be rotated 120 or 240 electrical degrees. The current circulated through the potential coil 15 of the control relay 14, under these conditions, will be rotated through 120° from the phase position indicated by the vector $i_{15}$ of Fig. 3. The pilot wire 24, of course, is not effected by the transposition of phases of the feeder 4, and the phase position of the pilot wire voltage remains normal. However, because of the phase rotation of the current in the potential coil 15, the control relay 14 will develop torque of approximately 50% maximum magnitude, but acting in the tripping direction rather than the closing direction. The armature of the control relay 14, accordingly, rotates in the counter-clockwise direction causing engagement of the relay tripping contacts, but no operation of the circuit breaker 8 occurs, as the latter is already open.

It will be seen that for any transposed condition of the feeder conductors 1, 2 and 3, the torque developed by the control relay 14 will be either zero or reversed in direction, and in either case will be of insufficient magnitude to overcome the biasing torque of the spring 17. The network circuit breaker 8 cannot be closed under these conditions, whether "closing" or "tripping" voltage is impressed on the pilot wire 24. The maximum torque condition of the control relay 14 in the closing direction, which is necessary for closure of the network circuit breaker 8, can occur only when the positive sequence secondary voltage of the transformer bank 7 is of normal magnitude, and occupies a predetermined phase position with reference to the phase of pilot wire voltage.

In some applications it may be preferable to compare the individual secondary voltages of the transformer bank, rather than the positive sequence voltage, with the pilot wire voltage before permitting closure of the network circuit breaker. In such applications, three individual induction type relays 32, 33 and 34 may be provided, as indicated in Fig. 4.

In Fig. 4, the direct trip device 11 and the fuses 28, which are similar to the corresponding elements of the network protector shown in Fig. 1, have been omitted, and only the control apparatus of the network protector shown, together with the network transformer bank 7 and the network circuit breaker 8. In this arrangement, the inductive reactance of the potential coil of the relay 32 produces a lag of approximately 90° in the potential coil current, thereby providing substantially maximum relay torque for the closing signal without the addition of any impedance in the potential coil circuit. The relays 33 and 34, however, which are energized from the b- and c-phase secondary conductors of the transformer bank 7, require a capacitor 33a and a resistor 34a, respectively, to produce the proper phase rotation of potential coil current for maximum closing torque when the pilot wire 24 is energized with closing voltage. It is assumed that the phase position of voltage applied to the pilot wire 24 is the same in Fig. 4 as in Fig. 1.

As mentioned above, in place of a separate communication channel such as a pilot wire, a carrier channel may be provided over the feeder itself for the transmission of the phase signal. An arrangement embodying such a carrier channel is shown in Fig. 5. In this figure the supply bus 5, feeder 4, transformer bank 7, direct trip device 11, network circuit breaker 8, fuses 28 and network load circuit may be similar to the corresponding elements of Fig. 1 and connected in the same manner. The phase sequence filter 18 is similar to the corresponding element of Fig. 1, but no phase adjusting impedance need be included in the circuit connecting the filter 18 and the potential coil of the relay 14.

The control relay 14 may be similar to the relay 14 of Fig. 1, but is preferably of a low-energy design which will operate upon a few watts input. Signal coils 35 of a large number of turns of very fine wire, may be provided to perform the function of the voltage type coils 16 used in the Fig. 1 modification. The signal coils 35 are connected to a full-wave rectifier 36, preferably of the copper oxide type, which may be energized from a suitable band pass filter 38 coupled to the feeder 4 by any suitable coupling device such as a capacitor 37.

The band pass filter 38 is designed to block the fundamental power frequency of the feeder 4 and to pass the carrier frequency impressed upon the feeder, and may be of any suitable design for this purpose, known in the art. In the arrangement shown, the band pass filter 38 consists of a tuning capacitor 39 connected to an inductive coupler 40 having its secondary terminals connected to a second tuning capacitor 41. The tuning capacitor 39 is preferably tuned to the carrier frequency with the self-inductive reactance of the associated winding of the coupler 40, and the tuning capacitor 41 is similarly tuned to resonance with the self-inductive reactance of the remaining winding of the coupler 40. The coupler 40 preferably provides loose coupling between the two tuned circuits.

A source of intermittent carrier frequency current 50 is provided at the station or sub-station for impressing timed pulses of carrier frequency current upon the feeder 4. In the arrangement shown, the source of signal current comprises a transformer 47 arranged to be connected through a suitable rectifier 48, preferably of the copper oxide type, and an inductive coupler 43 to a pair of spaced arc electrodes 45. The transformer 47 preferably has a secondary mid-tap, and a switch 46 is provided for reversing the polarity of potential applied to the arc electrodes 45 and rectifier 48 in series.

A tuning capacitor 49 is connected across the arc contacts 45 and the primary winding of the inductive coupler 43, to provide an arc-oscillator or singing arc circuit with the latter elements. The tuning capacitor 49 is designed to provide a resonant circuit with the self-inductive reactance of the primary winding of the coupler 43 at the carrier frequency to be superposed upon the feeder 4.

The tuning capacitor 44 is similarly designed to provide a resonant circuit with the self-inductive reactance of the secondary winding of the coupler 43 at the carrier frequency, and the coupler 43 provides loose coupling in the same manner as the coupler 40 associated with the individual network protector. A coupling capacitor 42 is provided for connecting the tuned circuit consisting of elements 43 and 44 to the feeder 4.

The secondary voltage developed by the transformer 47 may be quite high, for example 2200 volts effective from the terminal conductors to ground, and the gap 45 may be designed to breakdown at an instantaneous voltage of the order of 700 or 800 volts. With such design of the parts, the oscillator will function throughout the major portion of the alternating voltage half wave which is effective to pass current through the rectifier 48. Current flow during the reverse half wave of power frequency voltage is blocked by the action of the rectifier 48.

The operation of the signal current source 50, when the switch 46 is moved to closing position, is indicated by the time diagrams of Fig. 7. Referring to the latter figure, the secondary voltage of the transformer 47 is indicated by the sinusoidal curve $E_p$. The carrier signal is developed during the major part of one-half cycle of the transformer secondary voltage $E_p$ as indicated by the curve $E_s$. The carrier signal transmitted to the network protector is selected by the band pass filter 38 and is rectified by the rectifier 36 providing a rectifier current pulse of approximately 180° length on the scale of power frequency, as indicated by the curve $I_s$.

The current pulses $I_s$ have an alternating current component indicated by $I^1{}_s$, which cooperates with the current flowing in the potential coil of the control relay 14 to develop a torque in one direction or the other, depending upon which half cycle of secondary voltage of the transformer 47 is blocked by the rectifier 48. The operation of the apparatus shown in Fig. 5 will otherwise be obvious from that described in connection with Fig. 1.

I do not intend that the present invention shall be restricted to the specific structural details, arrangement of parts or circuit connections herein set forth, as various modifications thereof may be effected without departing from the spirit and scope of my invention. I desire, therefore, that only such limitations shall be imposed as are indicated in the appended claims.

I claim as my invention:

1. An alternating current network system of distribution comprising a supply bus located at a supply station, a polyphase feeder circuit, a feeder circuit breaker at said supply station for connecting said feeder circuit to said supply bus, a network load circuit, polyphase transformer means for supplying power from said feeder circuit to said network load circuit, a network circuit breaker for controlling the power flow through said transformer means, a pilot wire circuit extending from said supply station to said network circuit breaker, means for impressing an alternating voltage having a fixed phase relationship to the voltage of said supply bus upon said pilot wire circuit, and means for causing said network circuit breaker to close only if the system of phase voltages appearing at the transformer end of said feeder circuit, when said feeder circuit breaker is closed, bears a predetermined normal phase relationship to the alternating voltage transmitted by said pilot wire circuit.

2. An alternating-current network system of distribution comprising a supply bus located at a supply station, a feeder circuit comprising three phase conductors, a feeder circuit breaker at said supply station for connecting said feeder circuit to said supply bus, a network load circuit, polyphase transformer means for supplying power from said feeder circuit to said network load circuit, a network circuit breaker for controlling the power flow through said transformer means, a pilot wire circuit extending from said supply station to said network circuit breaker, means for impressing an alternating voltage having a fixed phase relationship to the voltage of said supply bus upon said pilot wire circuit, and closing means for said network circuit breaker, said closing means being responsive to the alternating voltage transmitted by said pilot wire circuit and to the phase voltages appearing at the transformer end of said feeder circuit when said feeder circuit breaker is closed, for effecting closure of said network circuit breaker when a normal voltage relationship exists and for preventing closure of said network circuit breaker when any of said phase conductors are transposed.

3. In an alternating-current network system of distribution having a polyphase supply bus, a polyphase feeder circuit energized from said supply bus, and a polyphase network load circuit, transformer means for supplying power from said feeder circuit to said network load circuit, a network circuit breaker for controlling the flow of power through said transformer means, and phasing means for said network circuit breaker including an induction relay, said induction relay having a first coil and a second coil in quadrature relationship, means for segregating a positive symmetrical component of a polyphase voltage condition of said transformer means and for energizing said first coil in accordance with the segregated component, and means for energizing said second coil in accordance with a periodically varying voltage having a phase position fixed with reference to system voltage independently of any condition of transposition of the conductors of said feeder circuit.

4. In an alternating current network system of distribution having a polyphase supply bus, a polyphase feeder circuit energized from said supply bus, and a polyphase network load circuit, transformer means for supplying power from said feeder circuit to said network load circuit, a network circuit breaker for controlling the flow of power through said transformer means, and phasing means for said network circuit breaker including an induction relay, said induction relay having a first coil and a second coil in quadrature relationship, means for segregating a positive symmetrical component of a polyphase voltage condition of said transformer means and for energizing said first coil in accordance with the segregated component, means for selectively energizing said second coil in accordance with a periodically varying closing voltage or a periodically varying opening voltage, said closing voltage having a phase position fixed with reference to system voltage independently of any condition of transposition of the conductors of said feeder circuit, said opening voltage having a phase position such as to include a component normally displaced 180° from said closing voltage.

5. In an alternating current network system of distribution having a polyphase supply bus, a polyphase feeder circuit energized from said supply bus, and a polyphase network load circuit, transformer means for supplying power from said feeder circuit to said network load circuit, a network circuit breaker for controlling the flow of power through said transformer means, and phasing means for said network circuit breaker including an induction relay, said induction relay having a first coil and a second coil in quadrature relationship, means for segregating a positive symmetrical component of a polyphase voltage condition of said transformer means and for energizing said first coil in accordance with the segregated component, and means for energizing said second coil in accordance with a periodically varying voltage having a phase position fixed with reference to a voltage condition of said supply bus.

6. In an alternating-current network system of distribution having a polyphase supply bus, a polyphase feeder circuit energized from said supply bus, and a polyphase network load circuit, transformer means for supplying power from said feeder circuit to said network load circuit, a network circuit breaker for controlling the flow of power through said transformer means, and phasing means for said network circuit breaker including an induction relay, said induction relay having a first coil and a second coil in quadrature relationship, means for segregating a positive symmetrical component of a polyphase voltage condition of said transformer means and for energizing said first coil in accordance with the segregated component, means for selectively energizing said second coil in accordance with a periodically varying closing voltage or a periodically varying opening voltage, said closing voltage having a phase position fixed with reference to a voltage condition of said supply bus, said opening voltage having a phase position such as to include a component normally displaced 180° from said closing voltage.

7. The method of identifying the conductors of a multiple-circuit feeder which comprises energizing one end of the feeder with a system of alternating voltages such that voltages having a difference in phase position are impressed between different pairs of feeder conductors, transmitting to the other end of said feeder a periodically repeating signal having a fixed time relationship to said system of alternating voltages, and comparing the time relationship of the system of voltages appearing at said other end of said feeder with the transmitted signal.

8. The method of identifying the conductors of a multiple-circuit feeder which comprises energizing one end of the feeder with a system of alternating voltages such that voltages having a difference in phase position are impressed between different pairs of feeder conductors, transmitting to the other end of said feeder an alternating voltage having a fixed phase relationship to said system of alternating voltages, and comparing the phase relationship of the system of voltages appearing between pairs of the feeder conductors at said other end of said feeder with the transmitted alternating voltage.

9. The method of identifying the conductors of an electric circuit which comprises energizing one end of the circuit with periodically varying voltage, additionally energizing said one end of said circuit with carrier voltage trains having a predetermined time relationship to said periodically varying voltage, each of said trains comprising a plurality of carrier pulsations, and comparing the time of appearance of the periodically varying voltage transmitted by said circuit with the time of appearance of the carrier trains transmitted to said other end.

10. The method of identifying the conductors of an electric circuit which comprises energizing one end of the circuit with alternating voltage, additionally energizing said one end of said circuit with carrier voltage trains having a predetermined time relationship to said alternating voltage, each of said trains comprising a plurality of carrier pulsations, and comparing the time of appearance of the transmitted alternating voltage with the time of appearance of the transmitted carrier trains.

11. The method of identifying the conductors of a three-phase alternating-current circuit which comprises energizing one end of the circuit with a three-phase system of voltages, transmitting a signal indicative of the phase of a voltage derived from said system of voltages to the other end of said circuit, and comparing the phase relationship of the polyphase system of voltages appearing at the other end of said circuit with the phase indicated by the signal.

12. In an alternating current system of transmission and distribution, a control station, a circuit breaker located at a remote point from said control station, a polyphase power source, a polyphase power circuit energized from said source, said power circuit having a remote end connected to said circuit breaker, and control means operable from said station for effecting closure of said circuit breaker, said control means comprising means for transmitting a repeating signal having a fixed time relationship to the phase voltages existing at the source end of said power circuit, and means responsive to the time relationship of the transmitted signal and the phase voltages appearing at said remote end of said power circuit for effecting closure of said circuit breaker, when all of the phase voltages appearing at said remote end bear a predetermined normal time relationship to the transmitted signal.

13. In an alternating-current system of transmission and distribution, a control station, a circuit breaker located at a remote point from said control station, a polyphase power source, a polyphase power circuit energized from said source, said power circuit having a remote end connected to said circuit breaker, and control means operable from said station for effecting closure of said circuit breaker, said control means comprising a circuit additional to said power circuit for transmitting an alternating voltage having a fixed phase relationship to the phase voltages existing at the source end of said power circuit and means responsive to the phase relationship of said alternating voltage and the phase voltages appearing at said remote end of said power circuit for effecting closure of said circuit breaker when all of the phase voltages appearing at said remote end bear a predetermined normal phase relationship to said alternating voltage.

14. In an alternating-current system of transmission and distribution, a control station, a circuit breaker located at a remote point from said control station, a polyphase power source, a polyphase power circuit energized from said source, said power circuit having a remote end connected to said circuit breaker, and control means operable from said station for effecting closure of said circuit breaker, said control means comprising means for transmitting a repeating signal having a fixed time relationship to the phase voltages existing at the source end of said power circuit, and means responsive to the time relationship of the transmitted signal and the phase voltages appearing at said remote end of said power circuit for preventing closure of said circuit breaker when any of the phase voltages appearing at said remote end bears an abnormal time relationship to the transmitted signal.

15. In an alternating current system of transmission and distribution, a control station, a circuit breaker located at a remote point from said control station, a polyphase power source, a polyphase power circuit energized from said source, said power circuit having a remote end connected to said circuit breaker, and control means operable from said station for effecting closure of said circuit breaker, said control means comprising a circuit additional to said power circuit for transmitting an alternating voltage having a fixed phase relationship to the phase voltages existing at the source end of said power circuit, and means responsive to the phase relationship of said alternating voltage and the phase voltages appearing at said remote end of said power circuit for preventing closure of said circuit breaker when any of the phase voltages appearing at said remote end bears an abnormal phase relationship to said alternating voltage.

16. In an alternating current system of transmission and distribution, a control station, a circuit breaker located at a remote point from said control station, a polyphase power source, a polyphase power circuit energized from said source, said power circuit having a remote end connected to said circuit breaker, and control means operable from said station for effecting closure of said circuit breaker, said control means comprising means for transmitting a repeating signal having a fixed time relationship to the phase voltages existing at the source end of said power circuit, means for segregating a positive symmetrical component of the system of phase voltages appearing at said remote end of said power circuit, and means responsive to the time relationship of said positive symmetrical component and the transmitted signal for effecting closure of said circuit breaker when said positive symmetrical component bears a predetermined normal time relationship to the transmitted signal.

17. In an alternating current system of transmission and distribution, a control station, a circuit breaker located at a remote point from said control station, a polyphase power source, a polyphase power circuit energized from said source, said power circuit having a remote end connected to said circuit breaker, and control means operable from said station for effecting closure of said circuit breaker, said control means comprising means for transmitting a repeating signal having a fixed time relationship to the phase voltages existing at the source end of said power circuit, means for segregating a positive symmetrical component of the system of phase voltages appearing at said remote end of said power circuit, and means responsive to the time relationship of said positive symmetrical component and the transmitted signal for preventing closure of said circuit breaker when said positive symmetrical component bears an abnormal time relationship to the transmitted signal.

18. In an alternating-current system of transmission and distribution, a control station, a circuit breaker located at a remote point from said control station, a polyphase power source, a polyphase power circuit energized from said source, said power circuit having a remote end connected to said circuit breaker, and control means operable from said station for effecting closure of said circuit breaker, said control means comprising a circuit additional to said power circuit for transmitting an alternating voltage having a fixed phase relationship to the phase voltages existing at the source end of said power circuit, means for segregating a positive symmetrical component of the system of phase voltages appearing at said remote end of said power circuit, and means responsive to the phase relationship of said positive symmetrical component and the transmitted signal for effecting closure of said circuit breaker when said positive symmetrical component bears a predetermined normal phase relationship to said alternating voltage.

19. In an alternating-current system of transmission and distribution, a control station, a circuit breaker located at a remote point from said control station, a polyphase power source, a polyphase power circuit energized from said source, said power circuit having a remote end connected to said circuit breaker, and control means operable from said station for effecting closure of said circuit breaker, said control means comprising a circuit additional to said power circuit for transmitting an alternating voltage having a fixed phase relationship to the phase voltages existing at the source end of said power circuit, means for segregating a positive symmetrical component of the system of phase voltages appearing at said remote end of said power circuit, and means responsive to the phase relationship of said positive symmetrical component and the transmitted signal for preventing closure of said circuit breaker when said positive symmetrical component bears an abnormal phase relationship to said alternating voltage.

20. An alternating-current network system of distribution comprising a supply bus located at a supply station, a polyphase feeder circuit, a feeder circuit breaker at said supply station for connecting said feeder circuit to said supply bus, a network load circuit, polyphase transformer means for supplying power from said feeder circuit to said network load circuit, a network circuit breaker for controlling the power flow through said transformer means, means providing a communication channel from said supply station to said network circuit breaker, means for selectively impressing a repeated closing signal upon said communication channel, said closing signal having a predetermined fixed time relationship to the voltage of said supply bus, and means for causing said network circuit breaker to close only if the system of phase voltages appearing at the transformer end of said feeder circuit, when said feeder circuit is closed, bears a predetermined normal time relationship to the transmitted closing signal.

21. An alternating current network system of distribution comprising a supply bus located at a supply station, a feeder circuit comprising three phase conductors, a feeder circuit breaker at said supply station for connecting said feeder circuit to said supply bus, a network load circuit, polyphase transformer means for supplying power from said feeder circuit to said network load circuit, a network circuit breaker for controlling the power flow through said transformer means, means providing a communication channel from said supply station to said network circuit breaker, means for selectively impressing a repeated closing signal upon said communication channel, said closing signal having a predetermined fixed time relationship to the voltage of said supply bus, closing means for said network circuit breaker, said closing means being responsive to the transmitted closing signal and the phase voltages appearing at the transformer end of said feeder circuit when said feeder circuit breaker is closed, for effecting closure of said network circuit breaker when a normal time relationship exists and for preventing closure of said network circuit breaker when any of said phase conductors are transposed.

GEORGE O. HARRISON.